(12) United States Patent
Musch et al.

(10) Patent No.: US 7,659,338 B2
(45) Date of Patent: Feb. 9, 2010

(54) DISPERSIONS

(75) Inventors: Rüdiger Musch, Gladbach (DE); Jan Mazanek, Köln (DE); Hermann Perrey, Krefeld (DE); Knut Panskus, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 902 days.

(21) Appl. No.: 11/013,177

(22) Filed: Dec. 15, 2004

(65) Prior Publication Data

US 2005/0137309 A1 Jun. 23, 2005

(30) Foreign Application Priority Data

Dec. 22, 2003 (DE) ................. 103 60 368

(51) Int. Cl.
C08K 3/34 (2006.01)
C08G 18/08 (2006.01)
(52) U.S. Cl. .................... 524/493; 524/507
(58) Field of Classification Search ................. 524/493, 524/507
See application file for complete search history.

(56) References Cited

U.S. PATENT DOCUMENTS

| | | | | |
|---|---|---|---|---|
| 3,920,600 | A | 11/1975 | Ahramijian | 260/29.7 UA |
| 4,108,814 | A | 8/1978 | Reiff et al. | 260/29.2 TN |
| 4,171,391 | A | 10/1979 | Parker | 427/246 |
| 4,699,945 | A | 10/1987 | Hausdoft et al. | 524/512 |
| 5,126,393 | A | 6/1992 | Blum et al. | 524/538 |
| 5,401,798 | A * | 3/1995 | Rasp et al. | 524/423 |
| 5,773,544 | A | 6/1998 | Christell et al. | 526/223 |
| 5,905,132 | A | 5/1999 | Wegner et al. | 528/45 |
| 6,054,527 | A | 4/2000 | Voss et al. | 524/834 |
| 6,767,947 | B2 | 7/2004 | Musch et al. | 524/273 |
| 2002/0120045 | A1 | 8/2002 | Musch et al. | 524/285 |
| 2003/0221778 | A1 | 12/2003 | Musch et al. | 156/325 |

FOREIGN PATENT DOCUMENTS

| | | |
|---|---|---|
| CA | 1 155 581 | 10/1983 |
| CA | 2253119 | 5/1999 |
| CA | 2 431 825 | 12/2003 |
| EP | 157 291 | 7/1989 |
| GB | 2 124 239 | 2/1984 |

OTHER PUBLICATIONS

Patent Abstract of Japan, Bd. 2000, Nr. 16, Mar. 8, 2001 & JP 2001 003021 A (Denki Kagaku Kogyo KK), Jan. 9, 2001.
Ullmanns Encyclopädie der technischen Chemie, vol. 9, (month unavailable) 1957, p. 366 Willhelm Foerst et al, "Kaustschak".
Encyclopedia of Polymer Science and Technology, vol. 3, (month unavailable) 1965, pp. 705-730, "2-Chlorobutadiene Polymers".
Methoden der Organischen Chemie (Houben-Weyl) XIV/1, (month unavailable) 1961, pp. 738-748, H. Logemann, "Polymerisation der wichtigsten Monomeren".
Ullmanns Encyclopädie der technischen Chemie, 4th Edition, vol. 19, (date unavailable) pp. 31-38, Dieter Maassen et al, "Polyalkylenglykole".
Mehtoden der Organischen Chemie (Houben-Weyl), vol. XIV/2, (month unavailable) 1963, pp. 1-47, Erwin Müller, Polycarbonsäureester.
Klebharze, R. Jordan and R. Hinterwaldner editiors, (month unavailable) 1994, pp. 75-115, Otmar Ackermann, Harzdispersionene.
Gmelins Handbuch der anorganischen Chemie, 8th Edition, vol. 32, (month unavailable) 1924, pp. 134-135, "Zinkoxyd" and in the supplementary vol. 32, (month unavailable) 1956, pp. 1001-1003.
Gmelins Handbuch der anorganischen Chemie, 8th Edition, vol. 27, (month unavailable) 1939, pp. 12/13, 47-50, 62-64, "Magnesiumoxyd".
Handbook of Adhesive, 2nd edition, (month unavailable) 1977, chapter 1, p. 12, Irving Skeist Editior, "Fundamentals".

* cited by examiner

*Primary Examiner*—William K Cheung
(74) *Attorney, Agent, or Firm*—Robert S. Klemz; Noland J. Cheung

(57) ABSTRACT

Polychloroprene dispersions containing particles of urea derivatives having a particle size in the range of 10 to 400 nm, which can be used in adhesive compositions. The adhesive compositions can be used to provide substrates containing adhesive layers obtained from the compositions.

19 Claims, No Drawings

DISPERSIONS

CROSS REFERENCE TO RELATED PATENT APPLICATION

The present patent application claims the right of priority under 35 U.S.C. §119 (a)-(d) of German Patent Application No. 103 60 368.9, filed Dec. 22, 2003.

BACKGROUND OF THE INVENTION

1. Field of the Invention

The invention concerns adhesive compositions based on aqueous polychloroprene dispersions, a process for their production and their use as contact adhesives for inorganic or organic substrates.

2. Description of the Prior Art

Polychloroprene production has long been known; it is performed by emulsion polymerisation in an alkaline aqueous medium, cf. "Ullmanns Encyclopädie der technischen Chemie", Vol. 9, p. 366, Verlag Urban und Schwarzenberg, Munich-Berlin 1957; "Encyclopedia of Polymer Science and Technology", Vol. 3, p. 705-730, John Wiley, New York 1965; "Methoden der Organischen Chemie" (Houben-Weyl) XIV/1,738 f, Georg Thieme Verlag Stuttgart 1961.

Contact adhesives based on polychloroprene are mainly solvent-containing adhesives which are first applied to both parts to be joined and allowed to dry. By subsequently joining the two parts under pressure, a join is obtained with a high green strength. This green strength can be increased significantly by the addition of chlorine rubber. In the case of substances that are difficult to bond, such as plasticised PVC, adequate adhesion using polychloroprene contact adhesives can only be achieved after a graft reaction in solution, with methyl methacrylate for example.

For ecological and economic reasons there is a growing demand for suitable aqueous polychloroprene dispersions which can be processed to form corresponding aqueous adhesive formulations. The disadvantage here, however, is that after evaporation of the water the green strength—in comparison to solvent-containing adhesives—is lower. Although polychloroprene dispersions modified with carboxyl or acrylate groups have improved adhesion on various substrates, their green strength is no greater, especially on substrates that are difficult to bond, such as plasticised PVC.

The object of the present invention was therefore to provide an aqueous adhesive composition which after application to the substrates to be bonded and after subsequent joining thereof has a high green strength, especially on substrates that are difficult to bond.

SUMMARY OF THE INVENTION

The present invention is directed to polychloroprene dispersions containing particles of urea derivatives having a particle size in the range of 10 to 400 nm.

The present invention also provides an adhesive composition that includes the above-described dispersions and adhesive auxiliary substances or additives selected from the group consisting of fillers, wetting agents, organic thickeners, bentonites, fungicides, tackifying resins, solvents, zinc oxide, magnesium oxide, stabilisers, and combinations thereof.

The present invention further provides substrates containing adhesive layers obtained from adhesives containing the above-described dispersions.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

The present invention provides an aqueous adhesive composition which after application to a substrate to be bonded and after subsequent joining thereof has a high green strength, especially on substrates that are difficult to bond. As an additional component the adhesive compositions according to the invention contain particles of urea derivatives, whose particle size is in the nanoscale range.

The object of the invention was achieved by the provision of an aqueous adhesive composition based on polychloroprene dispersions containing particles of urea derivatives in the nanoscale range.

The particles of urea derivatives can be produced in polychloroprene dispersions known per se, or the aqueous adhesive composition according to the invention is produced by mixing such polychloroprene dispersions with nano-urea dispersions. These nano-urea dispersions are aqueous dispersions of compounds containing urea and/or urethane groups, referred to below as "nano-urea", having an average particle size of 10 to 400 nm, preferably 10 to 250 nm, particularly preferably 20 to 150 nm. The nano-urea dispersions are produced by reacting polyisocyanates with substances containing amino and/or hydroxyl groups and/or water. The particle size can be influenced by the intensity with which the reaction mixture is stirred and depends on the stirrer geometry, reactor shape and energy input. In principle, the more intensive the stirring, the smaller the particles. These conditions must be determined and established by means of orienting preliminary tests on the system comprising polychloroprene dispersion or nano-urea dispersion, reactor and stirrer.

The present invention thus provides an adhesive composition comprising a polychloroprene dispersion containing nanoscale particles of urea derivatives, these dispersed nano-urea particles displaying an average particle size of 10 to 400 nm, preferably 10 to 250 nm, particularly preferably 20 to 150 nm.

Suitable polyisocyanates for producing the nano-urea derivatives according to the invention are all aliphatic, cycloaliphatic, araliphatic and aromatic polyisocyanates known per se having an isocyanate content of 0.5 to 50, preferably 3 to 30, particularly preferably 5 to 25 wt. %, or mixtures thereof. Examples of suitable polyisocyanates are butylene diisocyanate, tetramethylene diisocyanate, cyclohexane-1,3- and 1,4-diisocyanate, hexamethylene diisocyanate (HDI), 1-isocyanato-3,3,5-trimethyl-5-isocyanatomethyl cyclohexane (isophorone diisocyanate, IPDI), 2,4,4-trimethyl hexamethylene diisocyanate, isocyanatomethyl-1,8-octane diisocyanate, methylene bis-(4-isocyanato-cyclohexane), tetramethyl xylylene diisocyanate (TMXDI) or triisocyanatononane. Also suitable in principle are aromatic polyisocyanates such as 1,4-phenylene diisocyanate, 2,4- and/or 2,6-toluylene diisocyanate (TDI), diphenyl methane-2,4'- and/or -4,4'-diisocyanate (MDI), triphenyl methane-4,4'-diisocyanate,naphthylene-1,5-diisocyanate. Preferably suitable are polyisocyanates containing heteroatoms in the radical containing the isocyanate groups. Examples thereof are polyisocyanates displaying carbodiimide groups, allophanate groups, isocyanurate groups, urethane groups and biuret groups. Particularly preferred are polyisocyanates which are primarily used in the production of paints, e.g. modification products of the aforementioned simple polyisocyanates displaying biuret, isocyanurate or uretdione groups, particularly hexamethylene diisocyanate or isophorone diisocyanate.

Also suitable are polyisocyanates containing urethane groups, as are produced by reacting IPDI or TDI used in excess with polyol compounds, low-molecular-weight polyols in the molecular weight range from 62 to 300 and having an OH functionality of greater than 2 being preferred. Suitable low-molecular-weight polyols are short-chain aliphatic, araliphatic or cycloaliphatic diols or triols, i.e. those containing 2 to 20 carbon atoms. Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butyl propanediol, trimethyl pentanediol, positional isomeric diethyl octanediols, 1,3-butylene glycol, cyclohexanediol, 1,4-cyclohexane dimethanol, 1,6-hexanediol, 1,2- and 1,4-cyclohexanediol, hydrogenated bisphenol A (2,2-bis-(4-hydroxycyclohexyl) propane), 2,2-dimethyl-3-hydroxypropionic acid-(2,2-dimethyl-3-hydroxypropyl ester). 1,4-Butanediol, 1,4-cyclohexane dimethanol and 1,6-hexanediol are preferred. Examples of suitable triols are trimethylol ethane, trimethylol propane or glycerol, trimethylol propane and glycerol being preferred.

Suitable polyisocyanates are also the known prepolymers displaying terminal isocyanate groups, such as can be obtained in particular by reacting the aforementioned simple polyisocyanates, preferably diisocyanates, with reduced amounts of organic compounds having at least two isocyanate-reactive functional groups. In these prepolymers the ratio of isocyanate groups to isocyanate-reactive hydrogen atoms is 1.05:1 to 10:1, preferably 1.1:1 to 3:1, the hydrogen atoms preferably deriving from hydroxyl groups. Suitable organic compounds are for example polyurethanes, polyester polyols, polyether polyols, polycarbonate diols or polyacrylate or polymethacrylate polyols displaying hydroxyl groups, or mixtures thereof. It is likewise possible that the isocyanate groups in these prepolymers are wholly or partially blocked with suitable blocking agents. If the isocyanate groups are partially blocked, the prepolymer displaying OH groups can crosslink while being heated to suitable stoving temperatures without the addition of further isocyanate-reactive groups. These self-crosslinking one-component stoving systems are described for example in EP-A 0 726 919.

The nature and proportions of the starting materials used in the production of isocyanate prepolymers are chosen so that the isocyanate prepolymers display an average isocyanate functionality of 2 to 3 and a number-average molecular weight of 500 to 10,000, preferably 800 to 4000.

The nano-ureas contained in the adhesive compositions according to the invention are preferably modified to make them hydrophilic, such that the nano-urea particles in the aqueous phase remain in solution or form fine-particle, sedimentation-resistant dispersions.

Compounds having ionic groups, which can be of either a cationic or anionic nature, and/or non-ionic hydrophilic groups can be used here as hydrophilising agents. Compounds having a cationic, anionic or non-ionic dispersive action are those which contain for example sulfonium, ammonium, phosphonium, carboxylate, sulfonate, phosphonate groups or groups which can be converted into the aforementioned groups by salt formation (potentially ionic groups) or polyether groups and which can be incorporated into the macromolecules by isocyanate-reactive groups that are present. Preferably suitable isocyanate-reactive groups are hydroxyl and amine groups.

Suitable ionic or potentially ionic compounds are e.g. mono- and dihydroxycarboxylic acids, mono- and diaminocarboxylic acids, mono- and dihydroxysulfonic acids, mono- and diaminosulfonic acids and mono- and dihydroxyphosphonic acids or mono- and diaminophosphonic acids and salts thereof, such as dimethylol propionic acid, dimethylol butyric acid, hydroxypivalic acid, N-(2-aminoethyl)-β-alanine, 2-(2-aminoethylamino)ethane sulfonic acid, ethylene diamine propyl or butyl sulfonic acid, 1,2- or 1,3-propylene diamine-β-ethyl sulfonic acid, malic acid, citric acid, glycolic acid, lactic acid, glycine, alanine, taurine, lysine, 3,5-diaminobenzoic acid, an addition product of IPDI and acrylic acid (EP-A 0 916 647, Example 1) and alkali and/or ammonium salts thereof; the adduct of sodium bisulfate to butene-2-diol-1,4, polyether sulfonate, the propoxylated adduct obtained from 2-butenediol and NaHSO$_3$, described in DE-A 2 446 440 (page 5-9, formula I-III), for example, and structural units which can be converted into cationic groups, such as N-methyl-diethanolamine as hydrophilic building constituents. Preferred ionic or potential ionic compounds are those having carboxyl or carboxylate and/or sulfonate groups and/or ammonium groups. Particularly preferred ionic compounds are those containing the carboxyl and/or sulfonate groups as ionic or potentially ionic groups, such as the salts of N-(2-aminoethyl)-β-alanine, of 2-(2-aminoethylamino) ethane sulfonic acid or of the addition product of IPDI and acrylic acid (EP-A 0 916 647, Example 1) and of dimethylol propionic acid or hydroxypivalic acid.

Suitable compounds having a non-ionic hydrophilising action are e.g. polyoxyalkylene ethers containing at least one hydroxyl or amino group. These polyethers contain a proportion of 30 wt. % to 100 wt. % of structural units derived from ethylene oxide. Suitable examples are polyethers having a linear structure and a functionality of between 1 and 3, but also compounds having the general formula (I),

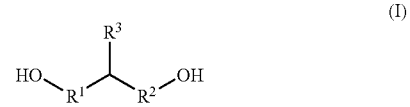

(I)

wherein
$R^1$ and $R^2$ mutually independently each denote a divalent aliphatic, cycloaliphatic or aromatic radical having 1 to 18 C atoms, which can be interrupted with oxygen and/or nitrogen atoms, and
$R^3$ stands for an alkoxy-terminated polyethylene oxide radical.

Compounds having a non-ionic hydrophilising action are for example also monovalent polyalkylene oxide polyether alcohols displaying as a statistical mean 5 to 70, preferably 7 to 55 ethylene oxide units per molecule, such as can be obtained by known means by alkoxylation of suitable starter molecules (e.g. in Ullmanns Encyclopädie der technischen Chemie, 4th Edition, Vol. 19, Verlag Chemie, Weinheim, p. 31-38).

Suitable starter molecules are for example saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methyl cyclohexanols or hydroxymethyl cyclohexane, 3-ethyl-3-hydroxymethyl oxetane or tetrahydrofurfuryl alcohol, diethylene glycol monoalkyl ethers such as e.g. diethylene glycol monobutyl ether, unsaturated alcohols such as allyl alcohol, 1,1-dimethyl allyl alcohol or oleic alcohol, aromatic alcohols such as phenol, the isomeric cresols or methoxy phenols, araliphatic alcohols such as benzyl alcohol, anisyl alcohol or cinnamyl alcohol, secondary monoamines such as dimethylamine, diethylamine, dipropylamine, diisopropylamine, dibutylamine, bis-(2-ethylhexyl)amine, N-methyl and N-ethyl cyclohexylamine or dicyclohexylamine and heterocyclic secondary amines such as morpholine, pyrrolidine, piperidine or 1H-pyrazole. Preferred starter molecules are saturated monoalcohols. Methanol, butanol and diethylene glycol monobutyl ether are particularly preferably used as starter molecule.

Suitable alkylene oxides for the alkoxylation reaction are in particular ethylene oxide and propylene oxide, which can be used in the alkoxylation reaction in any order or in a mixture.

The polyalkylene oxide polyether alcohols are either pure polyethylene oxide polyethers or mixed polyalkylene oxide polyethers, whose alkylene oxide units consist of at least 30 mol %, preferably at least 40 mol %, ethylene oxide units. Preferred non-ionic compounds are monofunctional mixed polyalkylene oxide polyethers displaying at least 40 mol % ethylene oxide units and a maximum of 60 mol % propylene oxide units.

Mixtures of various hydrophilising agents can also be used.

The hydrophilising agents can be incorporated into the polyisocyanates for use according to the invention by methods known per se. For example, part of the isocyanate groups can first be reacted with the blocking agents according to the invention and the remainder subsequently reacted with the hydrophilising agent. This process can also be performed in reverse, however, or the blocking of the isocyanate groups can take place in two steps, namely before and after hydrophilisation.

The hydrophilising agents can also be added at a different stage of production of the polyisocyanates according to the invention, such as e.g. during production of the prepolymers. Furthermore, hydrophilised polyethers, polyesters and/or polyacrylates can also be used as hydrophilising agents, such as are used for example in the production of self-crosslinking one-component stoving enamels, described for example in EP-A 0 726 919.

If mono- or dihydroxycarboxylic acids are used for hydrophilisation, partial or complete salt formation of the groups having an anionic and/or cationic dispersive action occurs. In the case of anionic groups bases such as ammonia, ammonium carbonate or hydrogen carbonate, trimethylamine, triethylamine, tributylamine, diisopropyl ethylamine, dimethyl ethanolamine, diethyl ethanolamine, triethanolamine, potassium hydroxide or sodium carbonate are used for this purpose, preferably triethylamine, triethanolamine, dimethyl cyclohexylamine, dimethyl ethanolamine or diisopropyl ethylamine. In the case of cationic groups dimethyl sulfate or succinic acid are used. If only non-ionically hydrophilised compounds with ether groups are used, the neutralisation stage is omitted. Neutralisation can also take place at the same time as dispersion if the dispersing water already contains the neutralising agent.

Compounds containing amino groups can also be used to produce the nano-urea dispersion. All known aliphatic, cycloaliphatic, araliphatic and aromatic monoamines, diamines and polyamines are suitable here, as well as polymers containing amino groups, such as aminopolyethers or oligoethyleneimines. Monoamines such as methylamine, ethylamine, (iso)propylamine and butylamine or diisopropylamine, diamines and triamines such as ethylene diamine, 1,3-propylene diamine, 1,6-hexamethylene diamine, isophorone diamine, 4,4'-diaminodicyclohexyl methane, diethylene triamine, triethylene tetramine, 1,3-and 1,4-phenylene diamine, 4,4'-diphenyl methane diamine, hydrazine, methylene bisaniline or triaminononane can be used, for example. Also suitable are heterocyclic amines such as pyrazole and triazole and derivatives thereof and aminofunctional polyethylene oxides or propylene oxides.

Suitable examples of compounds containing hydroxyl groups are dihydric to hexahydric, preferably dihydric to trihydric, particularly preferably dihydric alcohols in the molecular weight range from 62 to 183 or mixtures thereof. Typical examples are ethanediol-1,2, propanediol-1,2 and butanediol-1,4, -1,2 or -2,3, hexanediol-1,6, 1,4-dihydroxycyclohexane, glycerol, trimethylol ethane, trimethylol propane, pentaerythritol and sorbitol. Alcohols having ionic groups or groups that can be converted into ionic groups can also be used.

Polyhydroxypolyesters, polyhydroxypolyethers or polymers displaying hydroxyl groups, e.g. polyhydroxypolyacrylates or polyhydroxymethacrylates, can also be used as compounds containing higher molecular weight hydroxyl groups. The compounds generally display a hydroxyl value of 20 to 200, preferably 50 to 130, relative to 100% products. The compounds containing hydroxyl groups can optionally also contain the groups having a dispersive action already described.

The polyhydroxypolyacrylates or polyhydroxymethacrylates are mixed polymers of styrene with simple esters of acrylic acid and/or methacrylic acid, hydroxyalkyl esters such as e.g. 2-hydroxyethyl, 2-hydroxypropyl, 2-,3- or 4-hydroxybutyl esters of these acids also being used for the purpose of introducing the hydroxyl groups.

Suitable polyhydroxypolyethers are the ethoxylation and/or propoxylation products of suitable dihydric to tetrahydric starter molecules known per se from polyurethane chemistry, such as e.g. water, ethylene glycol, propanediol, trimethylol propane, glycerol and/or pentaerythritol.

Examples of suitable polyhydroxypolyesters are in particular the reaction products of polyhydric alcohols known per se in polyurethane chemistry, for example of alkane polyols of the type just mentioned by way of example with excess amounts of polycarboxylic acids or polycarboxylic anhydrides, particularly dicarboxylic acids or dicarboxylic anhydrides. Suitable polycarboxylic acids or polycarboxylic anhydrides are for example adipic acid, phthalic acid, isophthalic acid, phthalic anhydride, tetrahydrophthalic anhydride, hexahydrophthalic anhydride, maleic acid, maleic anhydride, Diels-Alder adducts thereof with cyclopentadiene, fumaric acid, malonic acid, succinic acid, succinic anhydride, glutaric acid, pimelic acid, suberic acid, sebacic acid, dodecanedioic acid or dimeric or trimeric fatty acids. Any mixtures of the polyhydric alcohols cited by way of example or any mixtures of the acids or acid anhydrides cited by way of example can also be used in the production of the polyester polyols.

The polyhydroxypolyesters are produced by known methods, as described for example in Houben-Weyl, Methoden der organischen Chemie, Vol. XIV/2, G. Thieme-Verlag, 1963, pages 1 to 47. The optionally required hydrophilic modification of these polyhydroxyl compounds is carried out by methods known per se, as disclosed for example in EP-A 0 157 291 or EP-A 0 427 028.

The nano-urea dispersions can be produced by methods known per se from polyurethane chemistry. A preferred method for producing the dispersions according to the invention is the reaction of polyisocyanates with water, wherein amine and carbon dioxide are first produced from the isocyanate and water. This amine then reacts with a further isocyanate group to form urea. Either all or just part of the isocyanate groups present in the polyisocyanate can be reacted with water here. The remaining isocyanate groups are reacted with compounds containing hydroxyl and/or amino groups before, during or at the same time as the water reaction. The particle diameter according to the invention of the urea particles is established by vigorous stirring of the reaction mixture.

Catalysts, co-solvents and other auxiliary substances and additives can also be used in the production of the nano-urea dispersions.

The adhesive compositions according to the invention can also be obtained by producing the nanoscale particles of urea compounds directly in the polychloroprene dispersion. The procedure for this is in principle the same as that described above for the production of the nano-urea dispersions. The pH of the dispersion is monitored and should not fall below pH 8, preferably pH 9; the pH is optionally readjusted by the addition of alkali.

The direct production of urea particles in the polychloroprene dispersion can be used for example to avoid reducing the solids content of an already adjusted polychloroprene dispersion by addition of a separately produced nano-urea dispersion. However, it is also possible for a mixture of a polychloroprene dispersion with a nano-urea dispersion to undergo a creaming process to re-establish a higher solids content of polychloroprene. It is likewise possible to add further nano-urea particles, optionally of a different average particle size, to a polychloroprene dispersion already containing nano-urea particles, by addition of a corresponding nano-urea dispersion or by producing these particles in said dispersion.

The invention therefore also provides processes for producing adhesive compositions according to the invention either by mixing a polychloroprene dispersion with a nano-urea dispersion or by producing the nano-urea particles in a polychloroprene dispersion, optionally with prior, simultaneous or subsequent addition of the conventional adhesive auxiliary substances and additives.

Suitable polychloroprene dispersions according to the invention are produced by emulsion polymerisation in an alkaline medium of chloroprene and an ethylene-unsaturated monomer capable of copolymerisation with chloroprene, as disclosed for example in WO-A 02/24825 (p. 3, line 26 to p. 7, line 4), DE-A 30 02 734 (p. 8, line 23 to p. 12, line 9) or U.S. Pat. No. 5,773,544 (column 2, line 2 to column 4, line 45). Particularly preferred are polychloroprene dispersions produced by continuous polymerisation, as described for example in WO-A 02/24825, Example 2, and DE 3 002 734, Example 6, wherein the regulator content can be varied between 0.01% and 0.3%. The average particle size of the polychloroprene dispersion is 60 to 220 mm, preferably 60 to 150 mm.

The solids content after the creaming process is 50 to 60% and the pH of the dispersions is 11 to 13. Crystallinity and gel content of the dispersions depends on the polymerisation conditions, such as e.g. monomer conversion, polymerisation temperature and proportion of comonomers. The polychloroprene dispersions can optionally also contain other dispersions such as e.g. polyurethane, polyacrylate, polyvinylidene chloride, polybutadiene, polyvinyl acetate or styrene-butadiene dispersions in a proportion of up to 45 wt. %.

The polymer dispersions according to the invention optionally contain other adhesive auxiliary substances and additives. Fillers such as silica flour, silica sand, barytes, calcium carbonate, chalk, dolomite or talc, optionally together with wetting agents, for example polyphosphates, such as sodium hexametaphosphate, naphthalene sulfonic acid, ammonium or sodium polyacrylic acid salts, can be added, for example, the fillers being added in quantities of 10 to 60 wt. %, preferably 20 to 50 wt. %, and the wetting agents in quantities of 0.2 to 0.6 wt. %, all values relative to non-volatile components.

Other suitable auxiliary substances are for example organic thickeners to be used in quantities of 0.01 to 1 wt. %, relative to non-volatile components, such as cellulose derivatives, alginates, starch, starch derivatives, polyurethane thickeners or polyacrylic acid, or inorganic thickeners to be used in quantities of 0.05 to 5 wt. %, relative to non-volatile components, such as e.g. bentonites.

Fungicides can also be added to the adhesive composition according to the invention to preserve it. These are used in quantities of 0.02 to 1 wt. %, relative to non-volatile components. Suitable fungicides are for example phenol and cresol derivatives or organotin compounds.

Tackifying resins such as e.g. unmodified or modified natural resins such as colophony esters, hydrocarbon resins or synthetic resins such as phthalate resins can optionally also be added in dispersed form to the polymer dispersion according to the invention (see e.g. in "Klebharze" R. Jordan, R. Hinterwaldner, p. 75-115, Hinterwaldner Verlag Munich 1994). Alkyl phenolic resin and terpene phenolic resin dispersions with softening points above 70° C., particularly preferably above 110° C., are preferred.

It is also possible to use organic solvents, such as e.g. toluene, xylene, butyl acetate, methyl ethyl ketone, ethyl acetate, dioxan or mixtures thereof, or plasticisers, such as e.g. those based on adipates, phthalates or phosphates, in quantities of 0.5 to 10 parts by weight, relative to non-volatile components.

Zinc oxide or magnesium oxide, as an acceptor for small amounts of hydrogen chloride which can be released by the chloroprene polymers, are preferably used as an additive. These are added in quantities of 0.1 to 10 wt. %, preferably 1 to 5 wt. %, relative to the non-volatile components, and can partially hydrolyse in the presence of the polychloroprene dispersions (a) or can contain hydrolysable components. In this way the viscosity of the polymer dispersion can be increased and adjusted to a desired level. This hydrolysation for ZnO is described for example in "Gmelins Handbuch der anorganischen Chemie", 8$^{th}$ Edition, 1924, Verlag Chemie Leipzig, Vol. 32, p. 134/135, and in the supplementary volume 32, Verlag Chemie, 1956, p. 1001-1003. It is described for MgO for example in "Gmelins Handbuch der anorganischen Chemie", 8$^{th}$ Edition, 1939, Verlag Chemie Berlin, Vol. 27, p. 12/13, 47-50, 62-64.

Other stabilisers, such as e.g. yellow lead oxide and additives that hydrolyse in the presence of alkaline polychloroprene dispersions, can also be added, however.

If a higher viscosity of the polymer dispersions according to the invention is not required, additions of ZnO or MgO can be omitted with no negative impact on the storage stability of the product.

The adhesive composition according to the invention can be applied by known means, e.g. by brushing, pouring, knife application, spraying, rolling or dipping. The adhesive film can be dried at room temperature or at elevated temperature up to 220° C.

The adhesive compositions according to the invention can be used for example for bonding any substrates of the same or different type, such as wood, paper, plastics, textiles, leather, rubber or inorganic materials such as ceramics, earthenware, glass fibres or cement.

The adhesive compositions according to the invention are characterised here in particular by their green strength on plasticised PVC, which makes it possible to join the substrates directly after applying the adhesive, without pretreating the substrate surfaces with primers.

The present invention also provides a process for bonding substrates, which can be the same or different, characterised in that the adhesive composition according to the invention is applied to the substrates and then the substrates are joined directly.

Furthermore, the aqueous adhesive composition according to the invention allows the bonding of substrates that are difficult to bond, such as e.g. thermoplastic olefins (TPO), or ethylene-vinyl acetate copolymers (EVA) with a high ethylene content, which otherwise cannot be bonded without pretreatment of the surface with a primer. Substrates that are difficult to bond are understood to be materials having a surface tension of less than 35 mN/m. Determination of this surface tension is described for example in "Handbook of Adhesives" chapter 1, p. 12, Van Nostrand Reinhold, New York, $2^{nd}$ Edition 1977, or in "Strukturelles Kleben und Dichten", Schindel-Bidinelli, Vol. 1, p. 191, Hinterwaldner Verlag, Munich 1988.

EXAMPLES

A) Polymer dispersions used

| Dispersion | Polymer type | Product* |
|---|---|---|
| A | Polychloroprene pH 12, slowly crystallising, gel-free, solids content 58 +/− 0.5 wt. %, emulsifier: abietic acid | Dispercoll ® C, VPLS 2372H |
| B | Polychloroprene pH 12, highly crystallising, gel-free, solids content 55 +/− 0.5 wt. %, emulsifier: abietic acid | Dispercoll ® C 84 |
| C | Polychloroprene pH 12, moderately crystallising, average gel content, solids content 58 +/− 0.5 wt. %, emulsifier: abietic acid | Dispercoll ® C 74 |

*All products from Bayer AG, Leverkusen, DE

B) Nano-ureas Used

Nano-urea 1

319.8 g of a hydrophilised aliphatic polyisocyanate (Bayhydur® VP LS 2336, Bayer AG, Leverkusen, Del.) are added at room temperature to 746.20 g of deionised water with stirring and stirred for a further 10 minutes. 0.05 g of triethylene diamine are then added and stirred vigorously at room temperature for 23 hours. Thereafter the dispersion no longer contained any isocyanate groups (IR spectrum). A white dispersion having the following properties was formed:

| | |
|---|---|
| Solids content: | 30% |
| Particle size (LKS): | 43 nm |
| Viscosity (DIN beaker 4): | 14 s |

Nano-urea 2

319.8 g of a hydrophilised aliphatic polyisocyanate (Bayhydur® VP LS 2336, Leverkusen, Del.) were added at room temperature (23° C.) to 744.2 g of deionised water with stirring. After adding 2.0 g of triethylene diamine, the mixture was heated to 35° C. After 1.5 hours 18.03 g of ethylene diamine, dissolved in 360 g of deionised water, were added within 10 minutes, and vigorous stirring was continued for a further 5 hours. Thereafter no isocyanate groups could be detected by IR spectroscopy. The dispersion obtained has the following properties:

| | |
|---|---|
| Solids content: | 23% |
| pH: | 6.71 |
| Particle size (LKS): | 91 nm |
| Viscosity (DIN beaker 4): | 12 s |

Nano-urea 3

The same procedure as described in the example for nano-urea 2 was followed, except that in place of triethylene diamine 1.28 g of dibutyl phosphate were used and stirring was continued for 4 hours at 23° C.; the ethylene diamine solution was then added at 35° C. The dispersion obtained had the following properties:

| | |
|---|---|
| Solids content: | 23% |
| pH: | 6.74 |
| Particle size (LKS): | 69 nm |
| Viscosity: | 13 s |

Nano-urea 4

19.4 g (0.19 g equiv.) of diisopropylamine were added at room temperature within 20 minutes to 58.80 g (0.297 g equiv.) of a commercial isocyanurate-containing paint polyisocyanate based on 1,6-diisocyanatohexane (HDI) having an isocyanate content of 21.4 wt. %, a viscosity at 23° C. of approx. 3000 mPas and a functionality of approx. 3.5, while being stirred. During this process the temperature rose to 43° C., the isocyanate content in the reaction mixture reached 5.04% (theoretically 5.07%). The reaction mixture was heated to 80° C. while being stirred and then 1.61 g (0.0135 mol) of 1,6-hexanediol and 6.42 g (0.054 mol) of hydroxypivalic acid, the latter dissolved in 10.36 g of N-methyl pyrrolidone, were then added one at a time within a total of 30 minutes. Stirring was continued at 80° C. for a further 2 hours, the isocyanate content reached 0.5%. 5.34 g (0.0594 mol) of dimethyl ethanolamine were then added at 70° C. and the mixture was stirred for a further 15 minutes. 143.84 g of warm deionised water at a temperature of 70° C. were then added and dispersed for 1 hour at 70° C. A stable white dispersion was obtained with the following properties:

| | |
|---|---|
| Solids content: | 30% |
| pH: | 8.93 |
| Viscosity (23° C.): | 200 mPas |
| Average particle size (LKS): | 20 nm |

Nano-urea 5

The same procedure as described in the example for nano-urea 4 was followed, except that 9.7 g of diisopropylamine were added. After adding 1, 6-hexanediol and hydroxypivalic acid, stirring was continued for a further 6 hours. Thereafter isocyanate could no longer be detected by IR spectroscopy. The dispersion had the following properties:

| Solids content: | 30% |
| Viscosity (23° C.): | 400 mPas |
| Average particle size (LKS): | 40 nm |

Nano-urea 6

123.90 g (0.295 mol) of a polyester consisting of adipic acid and 1,6-hexanediol having an average molecular weight of 840, 11.25 g (0.005 mol) of a polyethylene oxide-propylene oxide-polyether (80:20 mol/mol) started with n-butanol and having an average molecular weight of 2250, 6.76 g (0.15 mol) of 1,4-butanediol and 6.71 g (0.1 mol) of trimethylol propane were heated to 85° C. in an agitated tank and mixed homogeneously. After adding 26.83 g (0.2 mol) of dimethylol propionic acid, dissolved in 62.85 g of N-methyl pyrrolidone and 166.8 g (0.5 mol) of isophorone diisocyanate, the mixture was stirred for 135 minutes at 85° C. The product obtained contained 4.41% (calculated: 4.45%) of isocyanate groups. At 85° C. 26.54 g (0.305 mol) of butanone oxime were then added within 20 minutes and stirring was continued for 10 minutes. 160 g (0.5 g equiv. OH) of a polyester consisting of adipic acid, isophthalic acid, trimethylol propane, neopentyl glycol and propylene glycol having an OH value of 189 were then added and the reaction mixture was stirred overnight at 85° C. Thereafter it no longer contained any isocyanate groups (IR spectroscopy). At 85° C. a solution of 5.91 g (0.05 mol) of hydroxypivalic acid in 9.45 g of N-methyl pyrrolidone was added, the mixture stirred for 5 minutes and then 11.12 g (0.1 mol) of isophorone diisocyanate were added and the mixture stirred at 85° C. for 200 minutes. The reaction mixture then no longer contained any isocyanate groups. 22.29 g (0.25 mol) of N-dimethyl ethanolamine were then added, stirred for 10 minutes and then dispersed with 1390 g of warm water at a temperature of 50° C. with vigorous stirring, the mixture was stirred for a further 3 hours at 50° C. and allowed to cool while being stirred. The dispersion obtained had the following properties:

| Solids content: | 30% |
| Viscosity (DIN beaker 4): | 14 s |
| Particle size (LKS): | 31 nm |

Nano-urea 7

The same procedure as described in the example for nano-urea 6 was followed, except that 10.73 g of dimethylol propionic acid were used, together with 17.55 g of 2,2,4-trimethyl-1,3-pentadiol in place of trimethylol propane. On completion of the reaction 927 g of methyl ethyl ketone were added and the mixture was stirred for 1 hour. After addition of water with vigorous stirring the solvent was distilled off in vacuo at 25° C. The dispersion obtained had the following properties:

| Solids content: | 30% |
| Viscosity (DIN beaker 4): | 14 s |
| Particle size (LKS): | 150 nm |

Nano-urea 8

500 g of a polyester consisting of adipic acid, 1,6-hexanediol and neopentyl glycol having an average molecular weight of 1700, 148 g of a monofunctional polyether having an average molecular weight of 2250, 756 g of a polyester consisting of adipic acid and 1,6-hexanediol having an average molecular weight of 2000 and 175 g of dimethylol propionic acid were stirred under nitrogen for 2 hours at 120° C. After cooling to 70° C., 1599 g of isophorone diisocyanate, 44 g of trimethylol propane and 110 g of 1,4-butanediol were added and the mixture was stirred for 12 hours at 80° C. After cooling to 50° C., 7000 g of acetone were added and the mixture was stirred for 2 hours until a homogeneous solution was formed. This solution was added to a solution of 137 g of ethylene diamine and 3.0 g of ammonia in 6500 g of water with vigorous stirring. The acetone was then distilled off at 40° C./100 mbar. A dispersion having the following properties was formed:

| Solids content: | 35% |
| Viscosity (DIN beaker 4): | 15 |
| Particle size (LKS): | 110 nm |

B) Measuring methods

1) Determining the Peel Strength

The test is performed in accordance with EN 1392. A 100 μm thick wet film of the dispersion is applied to two specimens of Nora rubber (styrene-butadiene rubber, SBR) or plasticised PVC (30% DOP) measuring 100×30 mm, roughened with abrasive paper (grain size=80), and aerated at room temperature. The specimens are then shock activated and joined for 10 seconds under 4 bar. A tensile test is then performed on a commercial tensile testing machine at room temperature. The strength values immediately after bonding and after one day are determined.

2) Shock Activation:

The adherend surfaces are irradiated for 4 seconds with an IR radiator supplied by Funk (shock activation device 2000). The adhesive film on the Nora rubber is heated in this process to 49° C., 65° C. or 115° C., depending on the activation time. A 10 second activation of the adhesive film on the plasticised PVC sample produces a surface temperature of 92° C. Bonding is performed immediately after heat activation of the adhesive-coated specimens by placing the activated adhesive layers together and pressing them in a press. The specimens thus produced are stored at 23° C. and a relative humidity of 50%.

3) Peel Strength After Bonding by Hot Press Moulding (beechwood/unplasticised PVC)

3.1) Production of the Specimens:

The adhesives according to the invention are applied to a planed beechwood sheet (according to DIN 53-254. Dimensions: 50×140×4 mm) using a brush. The adhesive is applied to one side only of the beechwood specimen. The adherend surface measures 50×110 mm. After a drying time of 30 minutes at ambient temperature a second layer of adhesive is applied on top of the first and then dried for 60 minutes at ambient temperature. After the drying time it is pressed for 10 seconds with the untextured side of an unplasticised PVC laminating film (type: Benelit film RTF, dimensions 50×210× 0.4) in a membrane press under 4 bar effective pressure and at a joining temperature of 90° C.

3.2) Determining the Heat Distortion Temperature

The joined specimens are stored for 3 days at room temperature. The heat distortion temperature is determined in a universal drying oven with automatic temperature control. To this end the unbonded end of the beechwood specimen is attached at the top to a bracket by means of a wing screw. The overhanging end of the PVC test strip is loaded vertically downwards at an angle of 180° C. with a 500 g weight. The starting temperature is 50° C. The temperature is raised automatically by 10° C. after every hour until the PVC strip is completely detached (or torn) from the wooden specimen.

C) Production According to the Invention of an Adhesive

1) Based on a Polychloroprene Dispersion

TABLE 1

Production of the formulation for the comparative tests

| Product | Function | Addition as | Solids content (wt. %) | Parts by weight |
|---|---|---|---|---|
| Polychloroprene dispersion | Polymer | Dispersion | 55-58 | 100 |
| Rhenofit ® DDA-EM 50 (1) | Antioxidant | Dispersion | 50 | 2 |
| Emulvin ® W (2) | Stabiliser | Solution | 20 | 2 |
| Bayoxide ® Z, VP 9802 (3) | ZnO | Dispersion | 50 | 4 |
| Alresen ® VPT 1550 (4) | Resin 1 | Dispersion | 50 | 30 |
| Alresen ® VPT 1292 (4) | Resin 2 | | | |

Sources:
(1) Aqueous dispersion of a styrenated N-phenyl benzene amine, Bayer AG, Leverkusen, DE
(2) Aqueous solution of an alkylaryl polyglycol ether, Bayer AG, Leverkusen, DE
(3) Aqueous zinc oxide dispersion, Borchers, Monheim, DE
(4) Emulsifier-free terpene-phenol dispersions in water, Schenectady Europe S.A., Bethune, France To produce the formulation the polychloroprene dispersion is placed in a beaker. The stabiliser, antioxidant, ZnO and the resin are added with stirring.

D) Results

1) Peel Strength Measurement

TABLE 2

Measurement of the peel strength of NORA/NORA bonds
Variable: open assembly time before bonding, resin type, polychloroprene type

| No. | Disp. | Resin (parts by weight) Type/parts by wt. | Nano-urea Type | Nano-urea Parts by wt. | Peel strength (open assembly time: 30 min) immediate | Peel strength (open assembly time: 30 min) 24 hours | Peel strength (open assembly time: 60 min) immediate | Peel strength (open assembly time: 60 min) 24 hours |
|---|---|---|---|---|---|---|---|---|
| 1 | A | 1/30 | — | — | 1.3 | 2.1 | 1.2 | 1.8 |
| 2* | A | 1/30 | 10062 | 20 | 1.7 | 3.8 | 1.6 | 4.4 |
| 3* | A | 1/20 | 10062 | 30 | 2.0 | 4.3 | 2.0 | 3.8 |
| 4 | B | 2/30 | — | — | 1.5 | 2.8 | 2.2 | 4.3 |
| 5* | B | 2/30 | 10062 | 20 | 1.9 | 4.7 | 2.5 | 5.1 |
| 6 | B | 2/20 | — | — | 1.5 | 3.7 | 2.1 | 4.2 |
| 7* | B | 2/20 | 10062 | 30 | 1.7 | 4.4 | 2.4 | 5.5 |
| 8* | B | 2/20 | 100331 | 30 | 1.7 | 4.4 | 2.5 | 5.5 |
| 9* | B | 2/20 | 10041 | 30 | 1.8 | 3.5 | 2.1 | 5.3 |
| 10* | B | 2/20 | 10095a | 30 | 1.8 | 3.9 | 2.0 | 7.1 |
| 11 | C | 2/30 | — | — | 0.6 | 3.2 | 0.8 | 2.9 |
| 12 | C | 1/30 | — | — | 1.0 | 1.3 | 2.1 | 3.4 |
| 13* | C | — | 10062 | 30 | 1.3 | 2.1 | 2.9 | 4.2 |
| 14* | C | — | 10140 | 30 | 2.4 | 3.4 | 3.6 | 4.4 |
| 15* | C | — | 10139 | 30 | 2.0 | 1.9 | 2.5 | 4.7 |

*Example according to the invention

As the peel strength values in Table 2 show, the immediate strength and strength after 24 hours is raised in comparison to the comparative formulations by the addition of nano-ureas to the polychloroprene formulation in Table 1, both when resins are used (no. 2, 3, 5, 7, 8, 9, 10) and in resin-free formulations (no. 13, 14, 15).

TABLE 3

Measurement of the peel strength of wood/PVC bonds
Activation temperature 115° C.

| No. | Disp. | Resin Type/ parts by weight | Nano-urea Type | Nano-urea Parts by wt. | Peel strength (open assembly time: 60 min) immediate | Peel strength (open assembly time: 60 min) 24 hours | Heat distortion temp. (° C.) |
|---|---|---|---|---|---|---|---|
| 16 | A | 1/20 | — | — | 1.2 | 1.8 | 42 |
| 17* | A | 1/20 | 10062 | 30 | 2.0 | 3.0 | 48 |
| 18* | A | 1/20 | 10062 | 40 | 2.2 | 3.3 | 50 |
| 19* | A | 1/20 | 10062 | 50 | 3.2 | 4.0 | 54 |

*Example according to the invention

In bonds between the materials wood and PVC too it can be shown that both the strength of the bond and the heat resistance can be increased by the addition of nano-urea dispersions.

TABLE 4

Measurement of the peel strength of plasticised PVC bonds (30% DOP)

| | | Resin (parts by wt.) | Nano-urea | | Peel strength (open assembly time: 60 min) | |
|---|---|---|---|---|---|---|
| No. | Disp. | Type/parts by weight | Type | Parts by wt. | immediate | 24 hours |
| 20 | B | 1/30 | — | — | 0 | 0.2 |
| 21* | B | 1/30 | 10062 | 30 | 1.2 | 2.5 |
| 22* | B | 1/30 | 10265 | 30 | 1.3 | 1.5 |

*Example according to the invention

As Table 4 shows, using the example of the peel strengths of plasticised PVC, the green strength where polychloroprene dispersions are used is significantly improved by the addition of nano-urea dispersions in the adhesive compositions according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Polychloroprene dispersions containing particles of urea derivatives having a particle size in the range of 20 to 150 nm.

2. Dispersions according to claim 1, wherein urea derivatives based on deactivated polyisocyanates are used.

3. Dispersions according to claim 2, wherein urea derivatives based on deactivated polyisocyanates selected from the group consisting of dimerisation products, trimerisation products, urethane and urea derivatives of TDI, HDI, IPDI and 4,4-diisocyanatodicyclohexyl methane and/or mixtures thereof are used.

4. Dispersions according to claim 1, wherein the urea derivatives are obtained by complete or partial reaction of polyisocyanates with water.

5. Dispersions according to claim 1, wherein the urea derivatives are obtained by reacting polyisocyanates with compounds containing hydroxyl and/or amino groups and having an average molecular weight of 62 to 1000.

6. Dispersions according to claim 1, wherein the urea derivatives are obtained by reacting polyisocyanates with compounds containing hydroxyl and/or amino groups and having an average molecular weight of 62 to 400.

7. Dispersions according to claim 1, wherein the urea derivatives are obtained by reacting polyisocyanates with compounds containing hydroxyl and/or amino groups and having an average molecular weight of 62 to 200.

8. Dispersions according to claim 1, wherein dispersions of polymers and copolymers of 2-chlorobutadiene are used as polymer dispersions.

9. An adhesive composition comprising the dispersions according to claim 1, and adhesive auxiliary substances or additives selected from the group consisting of fillers, wetting agents, organic thickeners, bentonites, fungicides, tackifying resins, solvents, zinc oxide, magnesium oxide, stabilisers, and combinations thereof.

10. Substrates containing adhesive layers obtained from adhesives containing dispersions according to claim 1.

11. Dispersions according to claim 2, wherein the urea derivatives are obtained by complete or partial reaction of polyisocyanates with water.

12. Dispersions according to claim 2, wherein the urea derivatives are obtained by reacting polyisocyanates with compounds containing hydroxyl and/or amino groups and having an average molecular weight of 62 to 1000.

13. Dispersions according to claim 2, wherein the urea derivatives are obtained by reacting polyisocyanates with compounds containing hydroxyl and/or amino groups and having an average molecular weight of 62 to 400.

14. Dispersions according to claim 2, wherein the urea derivatives are obtained by reacting polyisocyanates with compounds containing hydroxyl and/or amino groups and having an average molecular weight of 62 to 200.

15. Dispersions according to claim 2, wherein dispersions of polymers and copolymers of 2-chlorobutadiene are used as polymer dispersions.

16. An adhesive composition comprising the dispersions according to claim 2 and adhesive auxiliary substances or additives selected from the group consisting of fillers, wetting agents, organic thickeners, bentonites, fungicides, solvents, zinc oxide, magnesium oxide, stabilisers, and combinations thereof.

17. Substrates containing adhesive layers obtained from adhesives containing dispersions according to claim 16.

18. An adhesive composition comprising the dispersions according to claim 3, and adhesive auxiliary substances or additives selected from the group consisting of fillers, wetting agents, organic thickeners, bentonites, fungicides, solvents, zinc oxide, magnesium oxide, stabilisers, and combinations thereof.

19. Substrates containing adhesive layers obtained from adhesives containing dispersions according to claim 18.

* * * * *